(12) United States Patent
Kudo

(10) Patent No.: US 10,442,491 B2
(45) Date of Patent: Oct. 15, 2019

(54) STRADDLE-TYPE VEHICLE

(71) Applicant: HONDA MOTOR CO., LTD., Minato-ku, Tokyo (JP)

(72) Inventor: Tomohiro Kudo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/088,843

(22) PCT Filed: Feb. 3, 2017

(86) PCT No.: PCT/JP2017/003957
§ 371 (c)(1),
(2) Date: Sep. 27, 2018

(87) PCT Pub. No.: WO2017/169106
PCT Pub. Date: Oct. 5, 2017

(65) Prior Publication Data
US 2019/0111990 A1 Apr. 18, 2019

(30) Foreign Application Priority Data

Mar. 30, 2016 (JP) .................................. 2016-068809

(51) Int. Cl.
*B62K 19/30* (2006.01)
*B62J 6/02* (2006.01)
(Continued)

(52) U.S. Cl.
CPC ............ *B62K 19/30* (2013.01); *B60Q 1/0035* (2013.01); *B60Q 1/34* (2013.01); *B62J 6/005* (2013.01);
(Continued)

(58) Field of Classification Search
None
See application file for complete search history.

(56) References Cited

U.S. PATENT DOCUMENTS 4,320,906 A * 3/1982 Saunders, IV ............. B62J 6/18
296/78.1
4,687,072 A * 8/1987 Komuro .................... B62J 6/001
180/219

(Continued)

FOREIGN PATENT DOCUMENTS

EP 2230162 9/2010
JP 54-114260 8/1979
(Continued)

OTHER PUBLICATIONS

International Search Report and Written Opinion for International Application No. PCT/JP2017/003957 dated May 16, 2017, 10 pages.
(Continued)

*Primary Examiner* — Chico A Foxx
(74) *Attorney, Agent, or Firm* — Amin, Turocy & Watson LLP

(57) ABSTRACT

The purpose of the present invention is to provide a straddle-type vehicle that enables reducing the number of components. Between front forks at the bottom edge of a top bridge configuring a motorcycle, a stay is provided which supports turn signals on each of the front forks. In this case, the stay is configured from a single member. Further, a stay fixing unit for fixing the stay and a first front fork fixing unit for fixing the front forks are provided on the top bridge. By this means, it is possible for the stay to be a single common member that supports turn signals on each of the front forks.

3 Claims, 4 Drawing Sheets

(51) Int. Cl.
    *B62J 6/18*     (2006.01)
    *B62J 6/00*     (2006.01)
    *B60Q 1/34*     (2006.01)
    *B60Q 1/00*     (2006.01)
    *B62K 21/04*     (2006.01)

(52) U.S. Cl.
    CPC . *B62J 6/02* (2013.01); *B62J 6/18* (2013.01); *B62K 21/04* (2013.01)

(56) References Cited

U.S. PATENT DOCUMENTS

| | | | | |
|---|---|---|---|---|
| 6,158,279 | A * | 12/2000 | Saiki | G01P 1/026 |
| | | | | 73/493 |
| D500,373 | S * | 12/2004 | Conte | D26/28 |
| 7,044,490 | B2 * | 5/2006 | Ito | B62K 25/08 |
| | | | | 280/276 |
| 8,134,456 | B2 * | 3/2012 | Osugi | B60Q 1/0088 |
| | | | | 340/465 |
| 8,215,813 | B2 * | 7/2012 | Yoshida | B62J 6/005 |
| | | | | 362/498 |
| 2004/0145897 | A1 | 7/2004 | Felty | |
| 2005/0083703 | A1 * | 4/2005 | Nakayama | B62J 6/005 |
| | | | | 362/473 |
| 2006/0072331 | A1 * | 4/2006 | Yamaguchi | B62J 35/00 |
| | | | | 362/473 |
| 2007/0247866 | A1 | 10/2007 | Domergue | |
| 2009/0231869 | A1 * | 9/2009 | Osugi | B60Q 1/0683 |
| | | | | 362/475 |
| 2009/0237231 | A1 | 9/2009 | Osugi et al. | |
| 2010/0195339 | A1 * | 8/2010 | May | B60Q 1/0483 |
| | | | | 362/473 |
| 2011/0273896 | A1 | 11/2011 | Yun | |
| 2012/0267911 | A1 * | 10/2012 | Ransone | B62J 17/02 |
| | | | | 296/78.1 |
| 2015/0258929 | A1 * | 9/2015 | Kato | B62J 6/02 |
| | | | | 362/473 |

FOREIGN PATENT DOCUMENTS

| | | |
|---|---|---|
| JP | 2009-226965 | 10/2009 |
| JP | 2014-061840 | 4/2014 |

OTHER PUBLICATIONS

Extended European Search Report for European Patent Application No. 17773655.0 dated Mar. 6, 2019.

* cited by examiner

STRADDLE-TYPE VEHICLE

TECHNICAL FIELD

The present invention relates to a saddle-type vehicle (straddle-type vehicle) in which blinkers are fixed respectively to front forks provided at both ends of a top bridge.

BACKGROUND ART

For example, according to the disclosure of Japanese Laid-Open Patent Publication No. 2009-226965, blinkers are fixed to front forks through stays, and the front forks are fixed to a top bridge through other stays provided at both ends of the top bridge.

SUMMARY OF INVENTION

Therefore, in the technique of Japanese Laid-Open Patent Publication No. 2009-226965, in addition to the stays for fixing the blinkers to the front forks, the other stays for fixing the front forks to the top bridge are required as well. Therefore, the number of component parts required for the saddle-type vehicle is large.

In view of the above, an object of the present invention is to provide a saddle-type vehicle which makes it possible to reduce the number of component parts.

A saddle-type vehicle according to the present invention includes a top bridge, front forks provided at both ends of the top bridge, and blinkers provided on the front forks, respectively. The saddle-type vehicle has the following features:

First feature: A stay is provided between the front forks at a lower end of the top bridge, and the stay is configured to allow the blinkers to be supported by the front folks, respectively. The stay is a single member. The top bridge is provided with a stay fixing unit configured to fix the stay, and front fork fixing units configured to fix the front forks.

Second feature: The stay is formed in a substantially recessed shape extending along the top bridge and the front forks.

Third feature: The front fork fixing units are provided respectively at both ends of the top bridge, and are tightening units configured to tightly fix the front forks to the top bridge, respectively. Both end portions of the stay and the blinkers are tightly fixed to the front forks by blinker fixing units each including a screw member. In this case, a tightening direction in which the tightening units are tightened with respect to the front forks and a tightening direction in which both end portions of the stay and the blinkers are fastened to the front forks are substantially the same.

Fourth feature: A harness bundling unit configured to bundle electric equipment harnesses is provided adjacent to the stay.

According to the first feature of the present invention, the stay made up of a single member is configured to allow the blinkers to be supported by the front folks, respectively. In this manner, the function of the stays for allowing the blinkers to be supported by the respective front forks can be performed by a single member.

Further, the stay is fixed between the front forks at the lower end of the top bridge by the stay fixing units. In this manner, the front forks are fixed directly to both ends of the top bridge by the front fork fixing unit, and fixed indirectly to the top bridge through the stay and the stay fixing unit. As a result, the stay supporting the blinkers also functions as a stay for fixing the front forks to the top bridge.

As described above, according to the first feature, the stay made up of one single member is used for fixing the blinkers and the front forks, and thus it is possible to reduce the number of component parts in comparison with the technique of Japanese Laid-Open Patent Publication No. 2009-226965.

According to the second feature of the present invention, since the stay is formed in a substantially recessed shape extending along the top bridge and the front forks, the stay made up of a single member can be easily formed for fixing both of the blinkers and the front forks, and it becomes easy to reduce the number of component parts. Further, it becomes possible to fix the blinkers and the front forks more firmly.

According to the third feature of the present invention, the tightening direction in which the tightening units are tightened with respect to the front forks and the tightening direction in which both ends of the stay and the blinkers are fastened to the front forks are substantially the same. Thus, the number of operation steps at the time of tightening is reduced, and the efficiency of tightening operation is improved.

According to the fourth feature of the present invention, the harness bundling unit configured to bundle electric equipment harnesses is provided adjacent to the stay. In this manner, it is possible to simplify the wiring layout of the electric equipment harness.

DESCRIPTION OF EMBODIMENTS

A preferred embodiment of a saddle-type vehicle according to the present invention will be described below in detail with reference to the accompanying drawings.

[Schematic Structure of Motorcycle 10]

Figure 1:
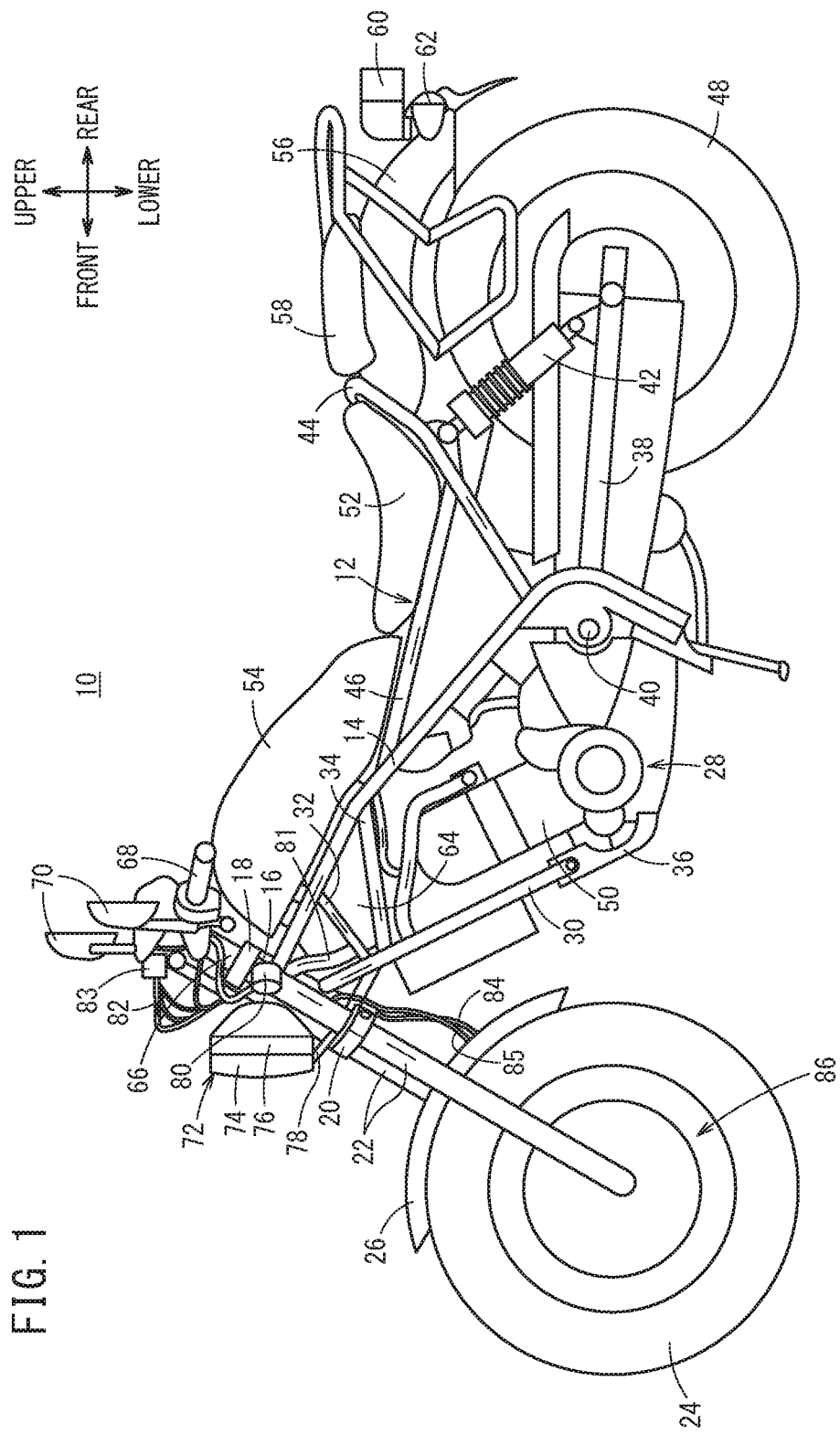
FIG. 1 is a left side view showing a motorcycle according to an embodiment of the present invention.

FIG. 1 is a left side view schematically showing a structure of a motorcycle 10 as a saddle-type vehicle according to the embodiment of the present invention. It should be noted that, in the following description, the traveling direction of the motorcycle 10 is defined as the "front/forward" direction, and the terms "front/rear (frontward/rearward)" "left/right", and "upper/lower" directions will be used based on this definition.

In the motorcycle 10, a head pipe 16 is provided at a front end of a main frame 14 of a vehicle body frame 12. The head pipe 16 supports a steering stem (not shown) in a pivotable manner. A top bridge 18 is fixed to an upper end of the steering stem, and a bottom bridge 20 is fixed to a lower end of the steering stem. The top bridge 18 and the bottom bridge 20 support a pair of left and right front forks 22. A front wheel 24 is supported by lower ends of the front forks 22 so as to be rotatable about the wheel axis. A front fender 26 is attached to the front forks 22 over the front wheel 24.

A hanger frame 30 is provided on the front side of the main frame 14. The hanger frame 30 supports an engine 28 on the front side of the main frame 14. The front side of the main frame 14 and the upper side of the hanger frame 30 are coupled together by a plurality of support frames 32, 34. A bracket 36 is fixed to a lower end of the hanger frame 30. The bracket 36 couples the hanger frame 30 and the engine 28 together. The rear side of the main frame 14 is curved downward, and a pivot 40 is provided at a position ahead of the curved portion of the main frame 14. The pivot 40 supports a swing arm 38 in a swingable manner about the pivot.

The rear side of the swing arm 38 is supported by a rear frame 44 through a pair of left and right rear cushions 42. The rear frame 44 is connected to a rear portion of the main frame 14. The rear frame 44 is coupled to the rear side of the curved portion of the main frame 14. A portion of the main frame 14 above the engine 28 and an intermediate portion of the rear frame 44 are coupled together by a support frame 46.

A rear wheel 48 serving as a drive wheel is supported on a rear end of the swing arm 38 so as to be rotatable about the wheel axis. The rotational driving force generated by the engine 28 is transmitted to the rear wheel 48 through a drive chain (not shown).

The engine 28 is fixed to a position surrounded by the main frame 14, the hanger frame 30, the bracket 36, and the pivot 40. A muffler (not shown) is attached to the front side of a cylinder block 50 of the engine 28. The muffler is coupled to an exhaust pipe provided on the rear side. A fuel injector (not shown) and an air cleaner box (not shown) are connected to the rear side of the cylinder block 50. Further, a driver's seat 52 is supported by the rear frame 44 and the support frame 46, and the rear cushions 42 are supported by the rear frame 44.

A fuel tank 54 is attached to the main frame 14, above the engine 28. The fuel tank 54 has a shape straddling the main frame 14 at the center of the vehicle body in the left-right direction (vehicle width direction). The driver's seat 52 is provided behind the fuel tank 54. A rear fender 56 is provided behind the driver's seat 52 and the rear frame 44. A passenger's seat 58, a tail lamp 60, and a pair of left and right rear blinkers 62 are attached to the rear fender 56.

The fuel tank 54 is provided on an upper portion of the main frame 14 behind the head pipe 16. An electric equipment box 64 containing electric equipment of the motorcycle 10 is disposed behind the head pipe 16 so as to extend from an upper side to a lower side of the main frame 14. The fuel tank 54 is disposed on the main frame 14 such that the fuel tank 54 covers the electric equipment box 64 from above. Further, in the state where the fuel tank 54 and the electric equipment box 64 are assembled together, the fuel tank 54 and the electric equipment box 64 are provided on the main frame 14.

In a side view of FIG. 1, a substantially triangular space is formed adjacent to the head pipe 16, by the main frame 14, the hanger frame 30, and the support frame 34. The electric equipment box 64 is disposed in the substantially triangular space surrounded by the pair of left and right main frames 14, the pair of hanger frames 30, and the pair of support frames 34. Therefore, in the side view of FIG. 1, the electric equipment box 64 has a substantially triangular shape.

Examples of electric equipment contained in the electric equipment box 64 include an ignition coil, an ignition key, a joint connector for connection between circuits, an ECU for controlling the engine 28, various relays (blinker relay, pump relay, fan relay, ignition relay), a bank angle sensor, and various couplers. It should be noted that these components are merely examples, and other components of electric equipment may be contained in the electric equipment box 64. Since these components of the electric equipment are known, the detailed description thereof is omitted.

A pair of left and right handlebar fixing units 66 are provided at an upper portion of the top bridge 18, and steering handlebars 68 are attached to the handlebar fixing units 66, respectively. Rearview mirrors 70 are attached to the pair of left and right steering handlebars 68, respectively.

A head light 72 is provided on the front side of the head pipe 16. The head light 72 includes a head light cover 74 and a housing 76. The head light 72 is fixedly supported on a bottom bridge 20. In the structure, a support member 78 extends rearward and obliquely downward from a lower portion of the head light cover 74, and a front end of the support member 78 is fixed to the bottom bridge 20. Thus, the head light 72 is supported on the front side of the head pipe 16. The blinkers 80 are attached to the pair of left and right front forks 22, respectively, on the left and right sides of the head light 72.

The electric equipment outside the electric equipment box 64 such as the head light 72 and the blinkers 80, and the electric equipment inside the electric equipment box 64 (e.g., ECU) are connected together through a wire harness 81 (electric equipment harness). For example, the wire harness 81 is drawn from the front side of the electric equipment box 64, and installed so as to be connected to the head light 72 and the blinkers 80.

Further, brake hoses 82, 84 and another wire harness 85 are drawn out from the front side of the electric equipment box 64. The brake hose 82 is connected to a master cylinder 83 attached to the right steering handlebar 68. Further, the other brake hose 84 is connected to a front wheel brake device 86. The brake hoses 82, 84 are coupled together in the electric equipment box 64. The other wire harness 85 is connected to a vehicle velocity sensor (not shown) provided adjacent to the front wheel brake device 86.

In the structure, when the rider operates a front wheel brake lever (not shown) provided at the steering handlebar 68, braking fluid pressure is applied from the master cylinder 83 to the front wheel brake device 86 through the brake hoses 82, 84, and a braking force is applied to the front wheel 24. Further, the vehicle velocity of the motorcycle 10 detected by a vehicle velocity sensor is outputted to the ECU through the wire harness 85.

Characteristic Structure of the Embodiment of the Present Invention

Next, a characteristic structure of the motorcycle 10 according to the embodiment of the present invention will be described with reference to FIGS. 2 to 4. As necessary, the embodiment will be described with reference to FIG. 1 as well.

Figure 2:
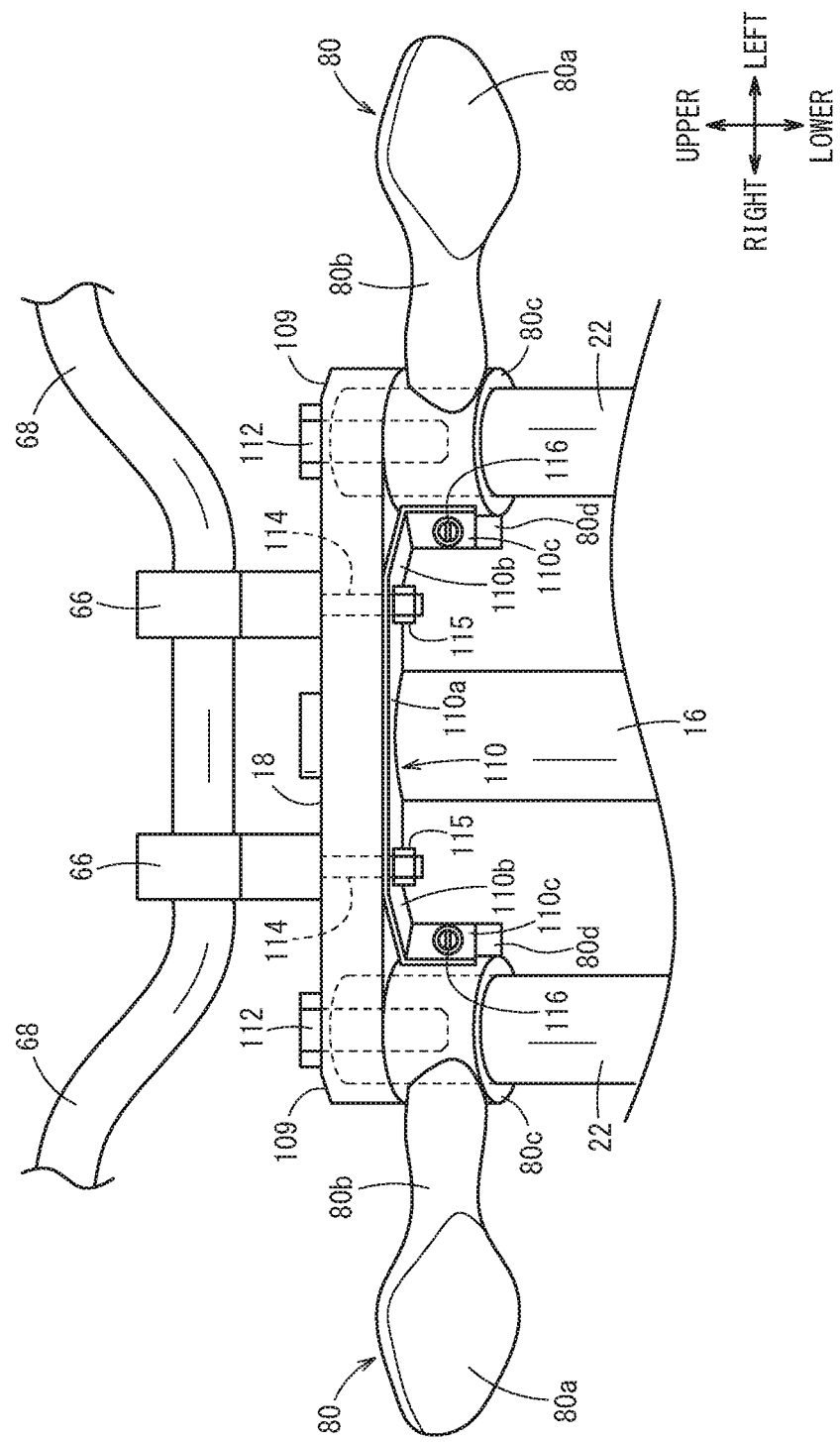
FIG. 2 is a front view in which an area around the top bridge in FIG. 1 is enlarged.
Figure 3:
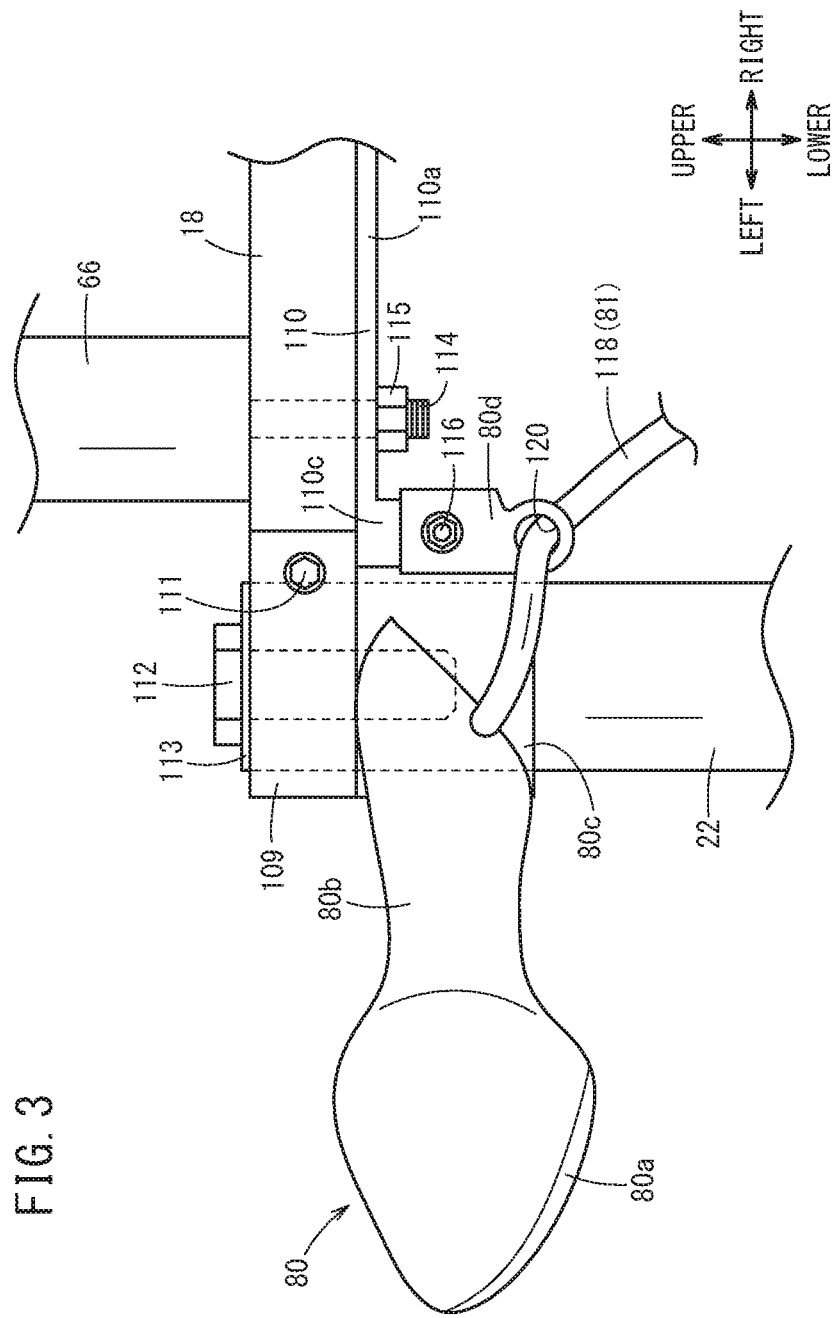
FIG. 3 is a partial perspective view showing the area around the top bridge in FIG. 2 as viewed from the rear side.
Figure 4:
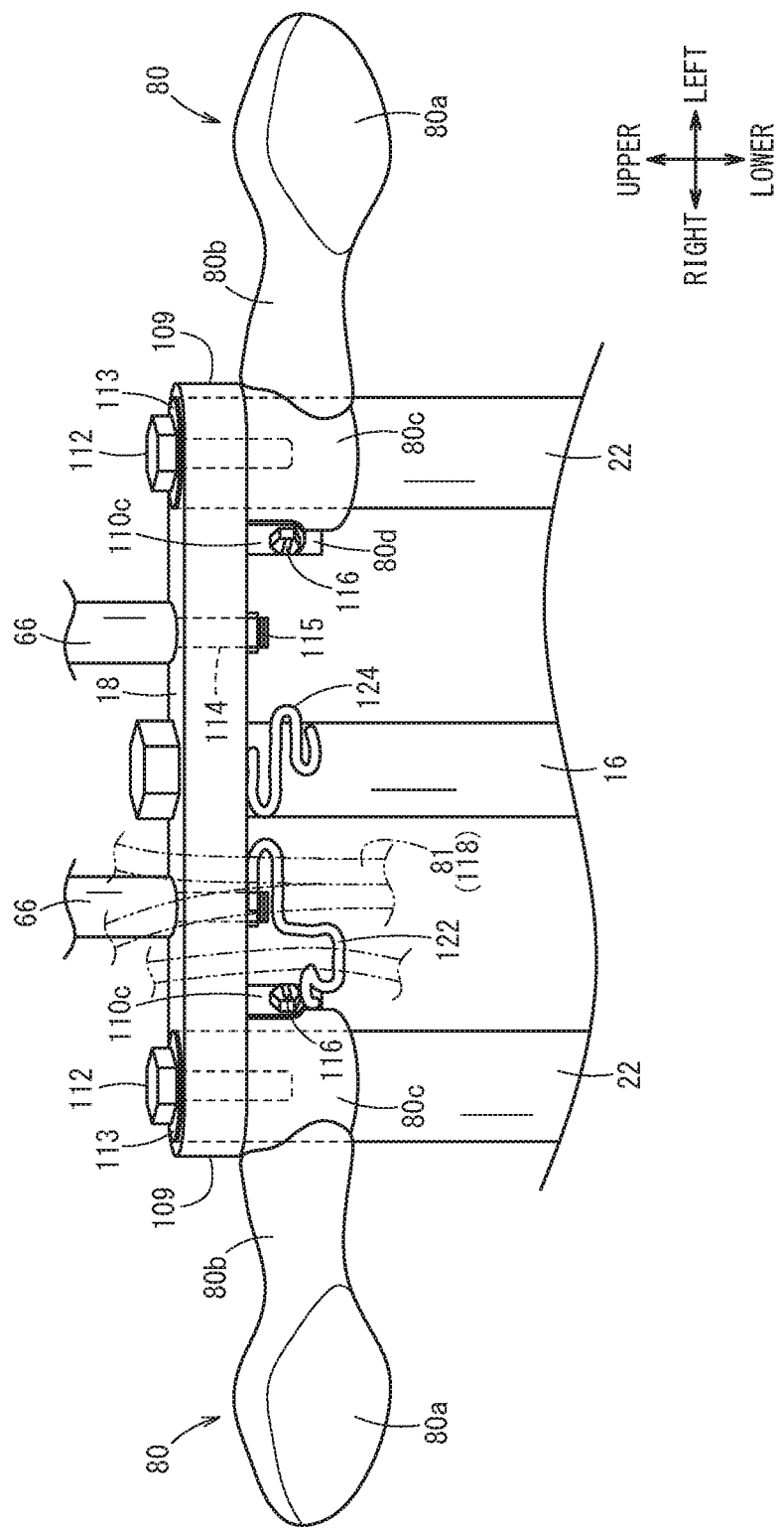
FIG. 4 is a perspective view showing a harness bundling unit.

In the characteristic structure of the motorcycle 10 according to the embodiment of the present invention, as shown in FIGS. 2 to 4, a stay 110 made up of a single member is provided between the front forks 22 provided at a lower end of the top bridge 18. The stay 110 allows the front forks 22 to support the respective blinkers 80.

As described above, each of the front forks 22 is fixed to the top bridge 18. Specifically, annular sections 109 are formed at both ends of the top bridge 18, and upper portions of the front forks 22 are fitted into the respective annular sections 109. In the structure, in the state where the upper portions of the front forks 22 are fitted into the annular sections 109 from below, position adjustment is performed such that the positions of screw holes (not shown) formed at front ends of the annular sections 109 coincide with the positions of other screw holes formed in the top bridge 18, and first front fork fixing units 111 (tightening units), which are screw members, are screw-engaged into the screw holes from the rear side. Therefore, (the top portions) of the front forks 22 are tightly fixed to the top bridge 18 in a substantially front/rear direction.

Further, screw holes (not shown) extending in the upper/lower direction are formed at upper positions of the front forks 22, respectively. Second front fork fixing units 112, which are screw members, are screw-engaged into the screw holes of the front forks 22 through washers 113, respectively, to thereby tightly fix the front forks 22 to both ends of the top bridge 18 in the upper/lower direction.

The blinker 80 includes a main body 80a housing therein a blinker lamp, an arm 80b extending from the main body 80a toward the front fork 22, a cylindrical annular section 80c which is in surface contact with the outer peripheral surface of the front fork 22, and a plate section 80d extending inward from the annular section 80c toward the head pipe 16.

The stay 110 has a substantially recessed shape extending along the lower end of the top bridge 18 and the front forks 22. Specifically, the stay 110 includes a plate section 110a extending in the left/right direction along the lower end of the top bridge 18 and which is in surface contact with the lower end of the top bridge 18, coupling sections 110b extending obliquely rearward from both ends of the plate section 110a toward the plate sections 80d of the blinkers 80, and plate sections 110c (end portions) extending downward from the ends of the coupling sections 110b along the annular sections 80c and the plate sections 80d of the blinkers 80 and which are in surface contact with the plate sections 80d.

In this case, in the plate section 110a as the proximal end portion of the stay 110, holes (not shown) pass through both of left and right sides of the head pipe 16 in the upper/lower direction, and holes having substantially the same diameter as these holes are formed in the top bridge 18. Stay fixing units 114 are provided at lower ends of the handlebar fixing units 66, respectively. The stay fixing units 114 are screw members which extend downward through these holes. Therefore, in the state where two stay fixing units 114 protruding from the lower end of the top bridge 18 pass through the holes of the stay 110, the stay fixing units 114 and nuts 115 are screw-engaged together with the stay 110 being sandwiched therebetween, whereby the stay 110 is tightened and fixed to the top bridge 18 in the upper/lower direction.

Therefore, the tightening direction in which the second front fork fixing unit 112 is tightened to thereby fasten or fix each front fork 22 to the top bridge 18 and the direction in which each stay fixing unit 114 are inserted into the top bridge 18 are substantially the same.

Further, the plate sections 110c as the front end portions of the stay 110 are in surface contact with the plate sections 80d of the blinkers 80, and a screw hole is formed in each of the plate sections 80d, 110c. In the state where the screw holes are aligned with each other, the blinker fixing units 116 made up of the screw members and the nuts are screw-engaged into the screw holes, whereby the plate sections 80d, 110c are tightened substantially in the frontward/rearward direction. In this manner, it is possible to fixedly position the annular sections 80c with respect to the front forks 22.

Thus, it is possible to fix the blinkers 80 to the front forks 22 directly. Further, the tightening direction in which the blinker fixing units 116 are tightened to thereby fasten or fix (the plate sections 110c of) the stay 110 and (the plate sections 80d of) the blinkers 80 to the front forks 22 and the tightening direction in which the first front fork fixing units 111 are tightened with respect to the front forks 22 are substantially the same.

It should be noted that the central part of the plate section 110a of the stay 110 is cut out in a concave shape in order to avoid interference with the head pipe 16. Further, the plate section 80d of the blinker 80 has a hole 120 into which a wire harness 118 (electric equipment harness) is inserted. The wire harness 118 is part of the wire harness 81 described above, and extended and connected to the blinker 80. That is, the wire harness 118 is a wire harness for supplying a drive signal for causing the blinker 80 to blink.

Further, as shown in FIG. 4, harness bundling units 122, 124 as harness binders for bundling the wire harnesses (e.g., wire harnesses 81, 118) are provided adjacent to the stay 110. The harness bundling units 122, 124 are wire members which are harder than the wire harnesses 81, 118, and curved in correspondence with the shapes of the wire harnesses 81, 118. Therefore, the wire harnesses 81, 118 extending in the vicinity of the stay 110 are held in a state the wire harnesses are gripped inside the annular portions of the harness bundling units 122, 124.

The harness bundling units 122, 124 shown in FIG. 4 are examples. That is, in the embodiment of the present invention, the harness bundling units 122, 124 may have any shape or structure as long as it is possible to bundle and bind the wire harnesses 81, 118 in the vicinity of the stay 110. For example, the wire harnesses may be binding bands or tapes. Further, in FIG. 4, the harness bundling units 122, 124 are provided in a floating state or non-fixing state in the vicinity of the stay 110. In the embodiment of the present invention, one end or both ends of the harness bundling units 122, 124 may be fixed to the top bridge 18, the front forks 22, or the stay 110.

Advantages of the Embodiment of the Present Invention

As described above, in the motorcycle 10 according to the embodiment of the present invention, the stay 110 is provided between the front forks 22 at the lower end of the top bridge 18. The stay 110 allows the blinkers 80 to be supported by the front forks 22, respectively. The stay 110 is made up of a single member. The top bridge 18 includes a stay fixing unit 114 for fixing the stay 110 and the first front fork fixing units 111 for fixing the front forks 22.

The stay 110 made up of the single member allows the blinkers 80 to be supported by the respective front forks 22. In this manner, the function of the stays for allowing the blinkers 80 to be supported by the respective front forks 22 can be performed by one single member.

Further, the stay 110 is fixed between the front forks 22 at the lower end of the top bridge 18 by the stay fixing unit 114. In this manner, the front forks 22 are fixed directly to both ends of the top bridge 18 by the first front fork fixing units 111, and fixed indirectly to the top bridge 18 through the stay 110 and the stay fixing units 114. As a result, the stay 110 supporting the blinkers 80 also functions as a stay for fixing the front forks 22 to the top bridge 18.

As described above, by using the stay 110 made up of the single member for fixing both of the blinkers 80 and the front forks 22, it is possible to reduce the number of component parts in comparison with the technique of Japanese Laid-Open Patent Publication No. 2009-226965.

Further, the stay 110 has a substantially recessed shape extending along the top bridge 18 and the front forks 22. In the structure, the stay 110 made up of a single member can be formed easily for both of the top bridge 18 and the front forks 22, and it becomes easy to reduce the number of component parts. Further, it becomes possible to fix the blinkers 80 and the front forks 22 more firmly.

Further, the first front fork fixing units 111 are provided at both ends of the top bridge 18, respectively, and are tightening units for tightly fixing the front forks 22 to the top bridge 18. The plate sections 110c of the stay 110 and the blinkers 80 are tightly fixed to the front forks 22, respectively, by the blinker fixing units 116 each including the screw member. In the structure, the tightening direction in which the first front fork fixing units 111 are tightened with respect to the front forks 22 and the tightening direction in which the plate sections 110c of the stay 110 and the blinkers 80 are fastened or fixed to the front forks 22 by tightening are substantially the same. Thus, the number of operation steps at the time of tightening is reduced, and the efficiency of tightening operation is improved.

It should be noted that the direction in which the second front fork fixing unit 112 is tightened for fixing the front forks 22 to the top bridge 18 and the direction in which the stay fixing units 114 are inserted into the top bridge 18 are substantially the same. Therefore, the number of operating steps at the time of tightening is reduced to a greater extent, and further improvement in the efficiency of the tightening operation is achieved.

Moreover, since the harness bundling units 122, 124 for bundling the wire harnesses 81, 118 are provided adjacent to the stay 110, it is possible to simplify the wiring layout of the wire harnesses 81, 118.

While the present invention has been described in connection with the preferred embodiment, the technical scope of the present invention is not limited to the scope of features in the description of the embodiment. It is apparent to those skilled in the art that various modifications or improvements may be made to the above embodiment. It is apparent from the description of the claims that the resulting embodiments with such modifications or improvements may fall within the technical scope of the present invention. In the claims, reference numerals in parenthesis are added in line with reference numerals in the accompanying drawings for ease of understanding the present invention, and shall not be construed to limit the present invention to the constituent elements labeled with such reference numerals.

What is claim is:

1. A saddle-type vehicle, comprising:
    a top bridge;
    front forks provided at both ends of the top bridge; and
    blinkers provided on the front forks, respectively,
    wherein a stay is provided between the front forks at a lower end of the top bridge, and the stay is configured to allow the blinkers to be supported by the front folks, respectively;
    the stay is a single member;
    the top bridge is provided with a stay fixing unit configured to fix the stay, and front fork fixing units are configured to fix the front forks;
    the front fork fixing units are provided respectively at both ends of the top bridge, and comprise tightening units configured to tightly fix the front forks to the top bridge, respectively;
    both end portions of the stay and the blinkers are tightly fixed to the front forks by blinker fixing units each including a screw member; and
    a tightening direction in which the tightening units are tightened with respect to the front forks and another tightening direction in which both the end portions of the stay and the blinkers are fastened to the front forks are substantially the same.

2. The saddle-type vehicle according to claim 1, wherein the stay is formed in a substantially recessed shape extending along the top bridge and the front forks.

3. The saddle-type vehicle according to claim 1, wherein a harness bundling unit configured to bundle electric equipment harnesses is provided adjacent to the stay.

* * * * *